United States Patent [19]
Hassitt et al.

[11] Patent Number: 5,724,585
[45] Date of Patent: Mar. 3, 1998

[54] METHOD FOR PROCESSING AN APPLICATION TERMINATION INITIATED FROM A PRE-INITIALIZED COMPUTER LANGUAGE EXECUTION ENVIRONMENT

[75] Inventors: Anthony Hassitt, Los Altos; Tsuneo Horiguchi, San Jose, both of Calif.

[73] Assignee: International Business Machines Corporation, Armonk, N.Y.

[21] Appl. No.: 540,112

[22] Filed: Oct. 6, 1995

[51] Int. Cl.$^6$ .......................................... G06F 9/00
[52] U.S. Cl. ........................ 395/672; 395/651; 395/680
[58] Field of Search .............................. 395/651, 680, 395/684, 685, 678, 710, 672, 676

[56] References Cited

U.S. PATENT DOCUMENTS

| | | |
|---|---|---|
| 4,636,948 | 1/1987 | Gdaniec et al. . |
| 4,833,594 | 5/1989 | Familetti et al. ................. 395/651 |
| 5,062,040 | 10/1991 | Bishop et al. ................. 395/684 |
| 5,093,914 | 3/1992 | Coplien et al. . |
| 5,136,709 | 8/1992 | Shirakabe et al. .............. 395/710 |
| 5,136,710 | 8/1992 | Arnold et al. ................. 395/651 |
| 5,371,742 | 12/1994 | Brown et al. . |
| 5,375,241 | 12/1994 | Walsh ......................... 395/685 |
| 5,379,432 | 1/1995 | Orton et al. . |
| 5,404,529 | 4/1995 | Chernikoff et al. . |
| 5,418,956 | 5/1995 | Willman . |
| 5,442,779 | 8/1995 | Barber et al. . |

OTHER PUBLICATIONS

L.R. Nackman and R.H. Taylor, "Exception–Handling Mechanism For Expression–Oriented Programming Languages," *IBM Technical Disclosure Bulletin*, vol. 26, No. 10A, Mar. 1984.

Rex E. Gantenbein and Douglas W. Jones, "The Design and Implementation of a Dynamic Binding Feature for a High–Level Language," *The Journal of Systems and Software 8*, 1988, pp. 259–273.

L.E. Gregg and F.P. Sheppard, "Integrated Hardware/Software Interrupt Controller," *IBM Technical Disclosure Bulletin*, vol. 31, No. 10, Mar. 1989.

Jean–Marc Adamo, "Exception handling for a communicating–sequential–processes–based extension of C++," *Concurrency: Practice and Experience*, vol. 3(1), pp. 15–41 (Feb. 1991), John Wiley & Sons, Ltd.

P.J. Plauger, "C and the environment," (C programming language), *C Users Journal*, Aug. 1992, vol. 10, No. 8, p. 8(5).

Sean Leary and Desmond D'Souza, "Catch the error: C++ exception handling," *Computer Language Journal*, Oct. 1992, vol. 9, No. 10, p. 63(9).

K. Carlsen, K.E. DuVall, T. Griffin, R. Heiney, C. Lewis, P. McMonagle and L. Washington, "Automatic Restart of a Stopped Process by a Managing Process," *IBM Technical Disclosure Bulletin*, vol. 36, No. 02, Feb. 1993.

Rick Spence, "Detect and Manage Errors in Clipper Programs," *Data Based Advisor*, May 1994, pp. 136–142.

Kevin Reichard and Eric F. Johnson, "Hanging On Open", Cross Thoughts, Programming, *Unix Review*, Jan. 1995, pp. 59–65.

Chuck Allison, "Control Structures," (C–programming language) (Code Capsuls), *Computer Select*, Mar. 1995, pp. 1–8.

Chuck Allison, "The Standard C. Library, Part 3," *C/C++ Users Journal*, Mar. 1995, pp. 59–78.

*Primary Examiner*—Kevin A. Kriess
*Attorney, Agent, or Firm*—Merchant, Gould, Smith, Edell, Welter & Schmidt

[57] ABSTRACT

A method, apparatus, and article of manufacture for pre-initializing, maintaining, and terminating a persistent language execution environment. The pre-initialization function allows the specification of a termination exit routine that is invoked on any attempted termination of an object program within the language execution environment, regardless of whether the attempted termination is initiated voluntarily or involuntarily.

36 Claims, 6 Drawing Sheets

METHOD FOR PROCESSING AN APPLICATION TERMINATION INITIATED FROM A PRE-INITIALIZED COMPUTER LANGUAGE EXECUTION ENVIRONMENT

BACKGROUND OF THE INVENTION

1. Field of the Invention

The present invention relates generally to language execution environments, and in particular, to functions for pre-initializing, maintaining, and terminating a persistent language execution environment.

2. Description of the Related Art.

Before an application program written in a particular programming language can be executed on the computer, the computer must initialize a language execution environment for the application. Typically this initialization is performed by an operating system, and often entails the execution by one or more procedures in a run-time library for the language by the operating system. This initialization of the language execution environment may comprise designating areas of the computer's memory for work area storage, initializing system variables for use in the memory, etc.

The term "pre-initialization" is meant to indicate the step of initializing a language execution environment for an object program before actually executing the object program. Thereafter, when the object program performs a termination, control is returned to the run-time library to perform the necessary functions associated with the termination of the language execution environment. However, the termination of the language execution environment can create problems.

For example, related programs or components that initiated the object program or the language execution environment, but are external to the language execution environment, may be also terminated. In these situations, it is important to give such external programs and components a chance to obtain control and perform any necessary processing before the language execution environment is terminated.

Transferring control of the termination to the external program or components outside of the language execution environment to be terminated is possible, if there is a signalling or exception management support system supported by the language execution environment and the external programs or components. An example of such a signal/exception management support system can be found in the publication "IBM Programming Guide IBM SAA AD/Cycle Language execution environment/370". This publication describes a callable service, known as CEEPIPI, that supports a language execution environment pre-initialization function using an exception handling system that communicates exceptions out of an environment.

However, exception handling systems are not always available for all computer platforms, especially when using multiple language execution environments. For many platforms, when a calling program or routine written in a first language (i.e., "LANG/1") invokes another program or routine written in another language (i.e., "LANG/2"), the invoked routine's language execution environment (the LANG/2 environment) must be initialized. An exit from the invoked program or routine results in the termination of the LANG/2 language execution environment, if it is the only or the last program routine written in that language that is operating within the environment. After termination, any subsequent invocation of a program or routine using the LANG/2 language execution environment results in the re-initialization of that environment.

The requirement to re-initialize the environment has two potentially negative implications. The first is the performance overhead of initializing and terminating the LANG/2 language execution environment for each invocation of a LANG/2 routine that is invoked repeatedly from a LANG/1 routine. The second is that a LANG/2 routine would be started in its initial state for each re-invocation, which may result in undesirable behavior of that routine since it will be invoked in its initial state rather than in its last used state as desired in many situations.

Thus, there is a need in the art for functions that pre-initialize, maintain, and terminate a persistent language execution environment.

SUMMARY OF THE INVENTION

To overcome the limitations in the prior art described above, and to overcome other limitations that will become apparent upon reading and understanding this specification, the present invention discloses a method, apparatus, and article of manufacture for pre-initializing, maintaining, and terminating a persistent language execution environment. The pre-initialization function also allows the specification of a termination exit routine that is invoked on any attempted termination of an object program within the language execution environment, regardless of whether the attempted termination is initiated voluntarily or involuntarily.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and in which are shown, by way of illustration, embodiments of the invention. It is to be understood that other embodiments may be utilized and structural changes may be made without departing from the scope of the present invention.

Overview

The present invention discloses a method, apparatus, and article of manufacture for pre-initializing, maintaining, and terminating a persistent language execution environment for the execution of computer programs.

In any computer language, there are provided run-time libraries of language-specific procedures that initiate, maintain, and terminate object programs under the control of the operating system of the computer. These libraries work together with the operating system to create a language execution environment for the execution of the object program, and in effect, control such execution.

In certain applications, it may be desirable for a first object program to execute a second (or third, etc.) object program as part of the functions provided by the application. Additionally, it may be desirable for the second object program to be written in a different computer language than the first object program, so as to take advantage of various features provided by the language. However, it is often not feasible to use different computer language object programs in the prior art, since there is a lack of communication between the different language execution environments.

The present invention provides the capability for the first object program to pre-initialize the language execution environment for the second object program, to maintain the language execution environment in a persistent state regardless of the status of the second object program, and to terminate the language execution environment at a desired time. These features greatly enhance the ability to mix different object programs using different language execution environments in a single application.

Hardware Environment

Figure 1:
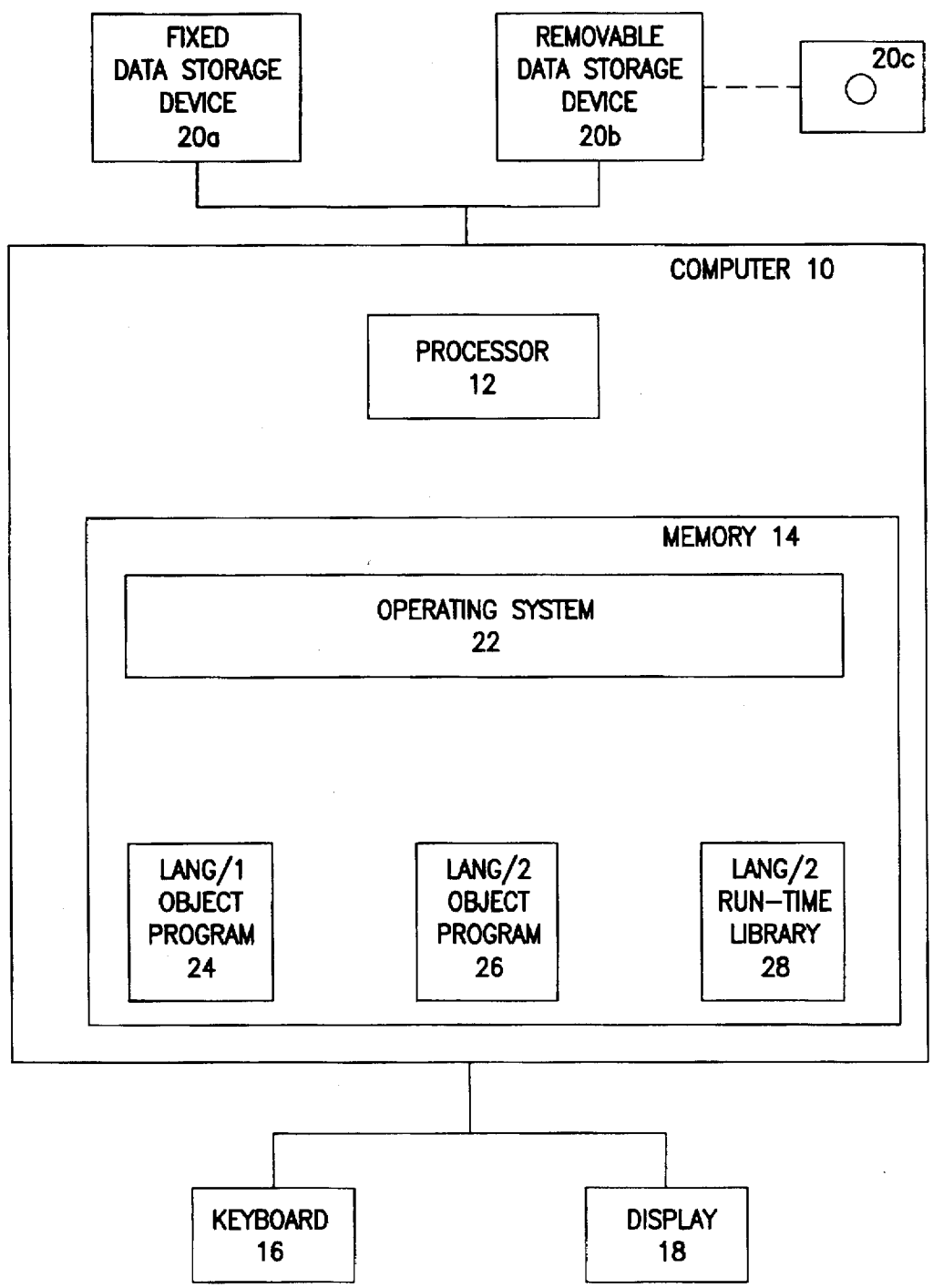
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a computer 10 may include, inter alia, a processor 12, memory 14, keyboard 16, display 18, as well as fixed and/or removable data storage devices and their associated media 20a, 20b, and 20c. Those skilled in the art will recognize that any combination of the above components, or any number of different components, peripherals, and other devices, may be used with the computer 10. The operation of the computer and its various components occurs under the control of an operating system 22, such as "OS/2™", "MICROSOFT WINDOWS™", "AIX™", "UNIX™", "DOS™", etc.

The present invention is generally implemented in the context of the functions performed by a first object program 24, second object program 26, and run-time library 28, all of which execute under the control of the operating system 22. In the preferred embodiment, the second object program 26 and run-time library 28 conform to ANSI COBOL language conventions, although those skilled in the art will recognize that they could also conform to other language conventions without departing from the scope of the present invention.

Using extensions built into standard language conventions according to the present invention, the run-time library 28 provides the capability for programmers to pre-initialize the language execution environment, to maintain it as a persistent language execution environment even when no object programs are executing within the environment, and to terminate the language execution environment when desired. These functions can all be performed externally to the language execution environment, i.e., typically by the invocation of certain procedures within the run-time library 28 by the first object program 24.

Generally, the operating system 22, first object program 24, second object program 26, and run-time library 28 are all tangibly embodied in a computer-readable medium, e.g., one or more of the fixed and/or removable data storage devices 20a and 20b and their associated media 20c. Moreover, the operating system 22, first object program 24, second object program 26, and run-time library 28 are all comprised of instructions which, when read and executed by the computer 10, causes the computer 10 to perform the steps necessary to implement and/or use the present invention. Under control of the operating system 22, the first object program 24, second object program 26, and run-time library 28 compiler 22 may be loaded from the data storage device 20a, 20b, or 20c into the memory 14 of the computer 10 for use during actual operations.

Language Execution Environment

Figure 2:
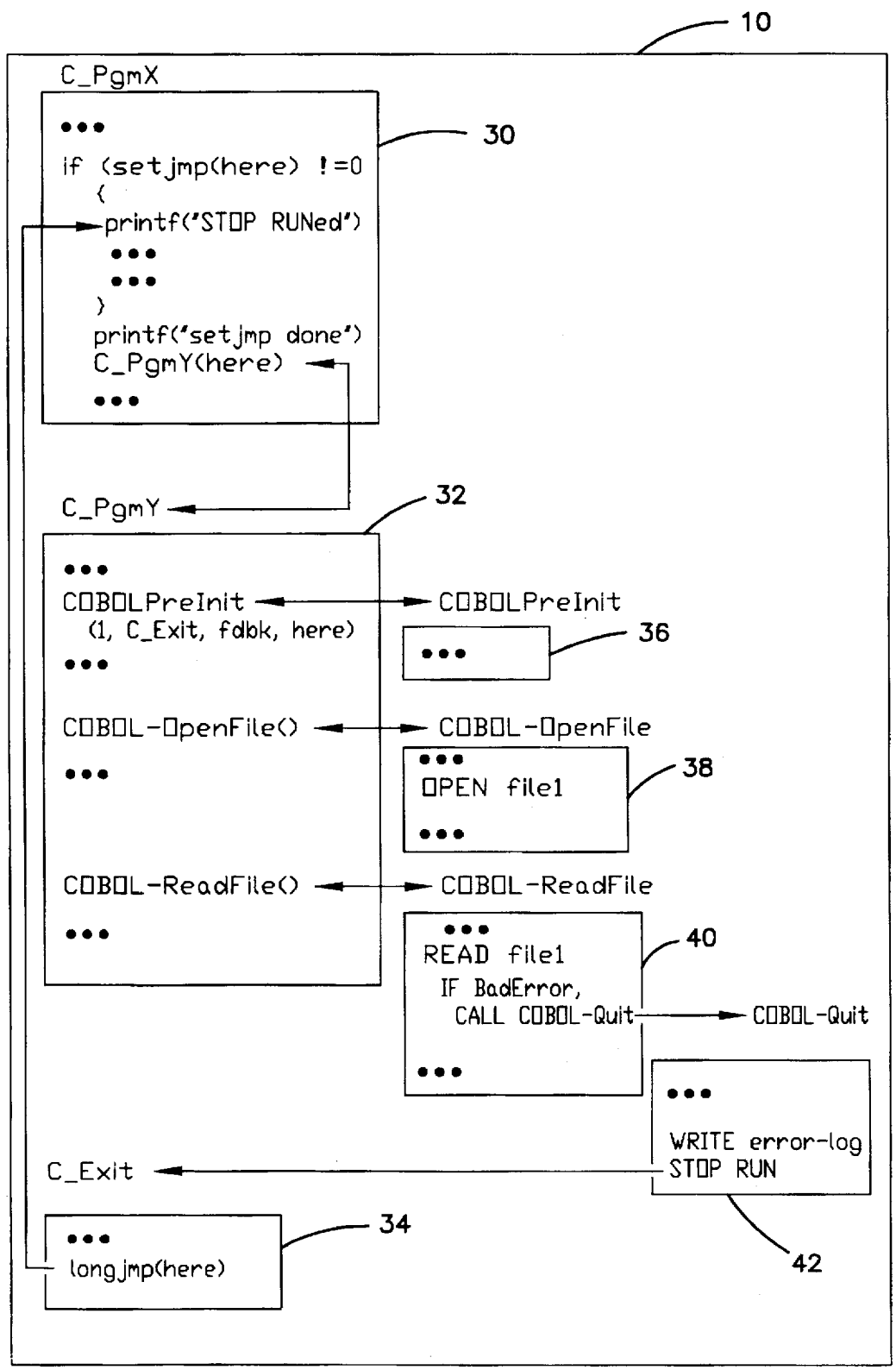
FIG. 2 is a dataflow diagram depicting a language execution environment according to the present invention using a sample application.

FIG. 2 is a dataflow diagram depicting a language execution environment according to the present invention. While only functions related to a COBOL language execution environment are depicted in FIG. 2, those skilled in the art will recognize that analogous functions could be provided for any other language execution environment.

The instructions and steps performed by the C language object programs and procedures 30, 32, and 34, and the COBOL language object programs and procedures 36, 38, 40, and 42 are indicated in FIG. 2 using source language statements, legends, and arrows for illustrative purposes. However, those skilled in the art will recognize that the C language object programs and procedures 30, 32, and 34, and the COBOL language object programs and procedures 36, 38, 40, and 42 are comprised of assembly language or machine language instructions executed by the computer 10.

In the example shown in FIG. 2, a first C language object program 30, labeled as C_PGMX, sets a "longjmp" address in the variable "here" using a "setjmp" instruction. This "longjmp" address provides an address as a branch target after any exit or termination, as described in more detail below. The first object program 30 then prints the message "setjmp done" and invokes a second C language object program 32, labelled as C_PGMY, passing the variable "here" as an argument.

The second C language object program 32 invokes the pre-initialization procedure 36, labelled as COBOLPREINIT, as indicated by the arrow therebetween. The COBOLPREINIT procedure 36 typically resides in a run-time library 28 resident in the memory and/or the data storage devices 20a–c of the computer 10. The COBOLPREINIT procedure 36 preinitializes the COBOL language execution environment and renders the environment persistent. However, since the COBOLPREINIT procedure 36 is only a pre-initialization function, it does not actually invoke a COBOL language object program. The invocation needs to be done separately.

Four parameters are passed to the COBOLPREINIT procedure 36 by the second C language object program 32. The first parameter, 1, is a flag that indicates that the COBOL language execution environment should be made persistent. The next parameter, C_EXIT, is the address of the termination exit routine to be used instead of the normal termination functions for the COBOL language execution environment. The third parameter, fdbk, allows the second C language object program 32 to receive error indications generated by the COBOLPreInit procedure 36. Finally, the fourth parameter, here, is an address in the first C language object program 30, that provides a branch target for the C-EXIT routine. After completion, the COBOLPREINIT procedure 36 returns control to the second C language object program 32 by means of a return or GOBACK instruction.

Thereafter, the second C language object program 32 invokes the COBOL language object programs 38 and 40, labelled as COBOL-OPENFILE and COBOL-READFILE, as indicated by the arrows therebetween. The COBOL-OPENFILE program 38 opens a file and then returns control to the second C language object program 32 by means of a return or GOBACK instruction. The COBOL-READFILE program 40 reads one record at a time and then, after a successful read of a record, returns control to the second C language object program 32 by means of a return or GOBACK instruction.

In the prior art, the return or GOBACK instructions would invoke a termination routine in the run-time library 28 that causes the termination of the COBOL language execution environment. In the present invention, these attempted terminations are intercepted by the termination routine in the run-time library, and dealt with differently, because the COBOLPREINIT procedure 36 has pre-initialized the COBOL language execution environment and rendered it persistent. Therefore, it is not necessary to re-initialize the COBOL language execution environment after each return or GOBACK instruction in a COBOL language object program or procedure. On the other hand, an exit or STOP RUN instruction is handled somewhat differently, as described below.

Referring again to FIG. 2, if the COBOL-READFILE program 40 receives an exception on a read (including the end-of-file condition), then it invokes another COBOL language object program 42, labelled as COBOL-QUIT, to attempt a termination using an exit or STOP RUN instruction. However, in the present invention, this attempted termination is intercepted at the termination function in the run-time library 28. Thereafter, a branch is made to the termination exit routine, C_EXIT, first specified in the COBOLPREINIT procedure 36. As a result, control is transferred from the COBOL-QUIT program 42 to the C_EXIT address in the third C language object program 34. Furthermore, the token "here" is passed as a parameter to the termination exit routine.

In the prior art, the exit or STOP RUN instructions would invoke a termination routine in the run-time library 28 that causes the termination of the COBOL language execution environment. In the present invention, these attempted terminations are intercepted by the termination routine in the run-time library 28, and dealt with differently, because the COBOLPREINIT procedure 36 has pre-initialized the COBOL language execution environment and rendered it persistent. Therefore, it is not necessary to re-initialize the COBOL language execution environment after each exit or STOP RUN instruction in a COBOL language object program or procedure. On the other hand, this does require that the other techniques be used to terminate the COBOL language execution environment, as described below.

Although not shown in the example of FIG. 2, the C language object programs 30, 32, or 34, could also invoke a termination function for the pre-initialized COBOL language execution environment. Such a termination function would be invoked as a procedure in the run-time library 28, much like the pre-initialization function. The termination function would perform "clean up" actions consistent with those performed when an exit or return instruction has been executed. However, the control will return to the calling procedure or program.

Pre-Initialization Function

Figure 3:
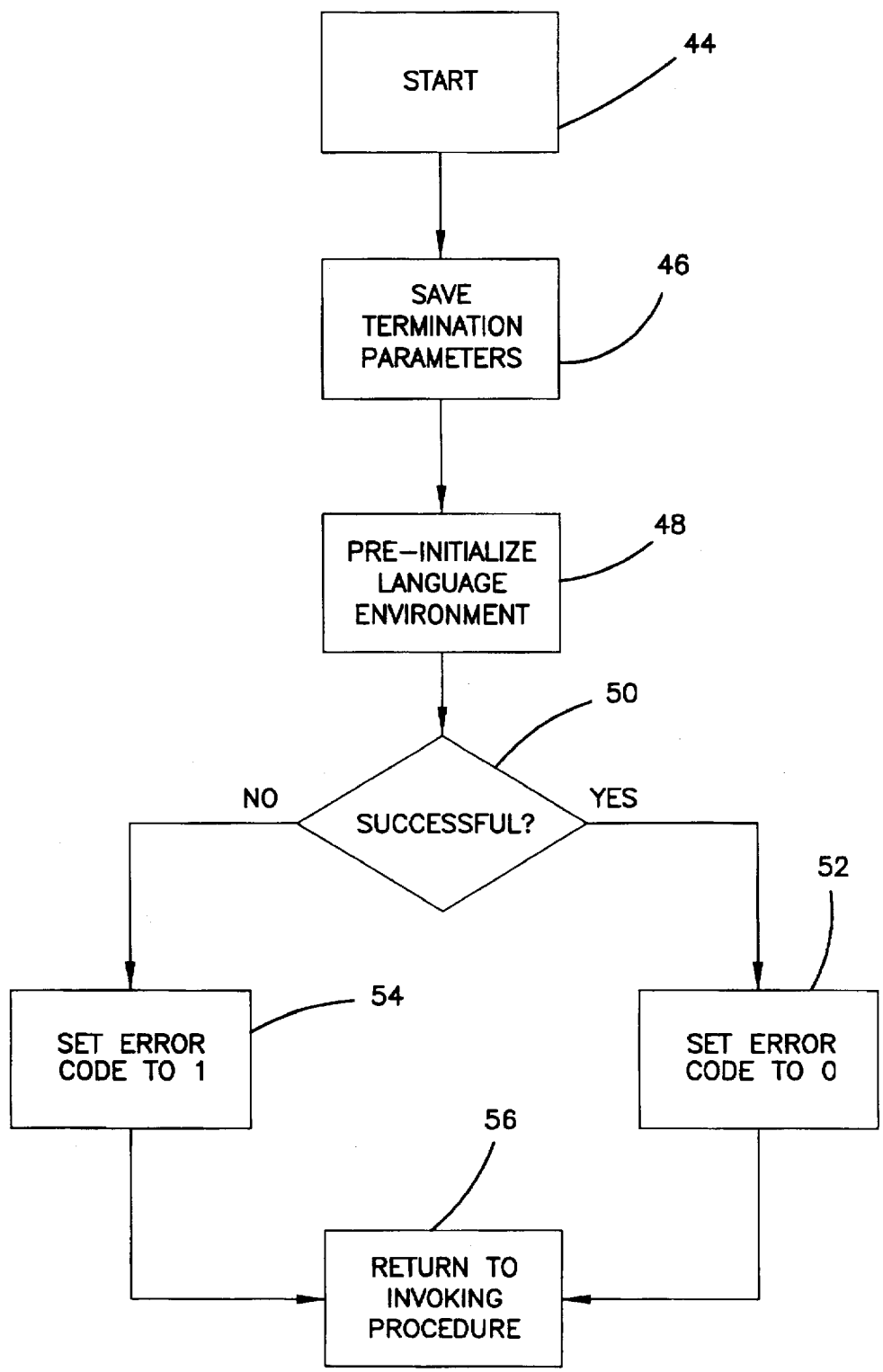
FIG. 3 is a flow chart illustrating the steps performed by the pre-initialization function according to the present invention.

FIG. 3 is a flow chart illustrating the steps performed by the pre-initialization function in the run-time library 28 according to the present invention. Block 44 represents the start of the pre-initialization function. Following block 44, block 46 saves the parameters passed to the pre-initialization function to maintain the persistent language execution environment, wherein one of the parameters is the address of a termination exit routine and another of the parameters is the address of a token passed to the termination exit routine. Following block 46, block 48 pre-initializes the target language execution environment and sets the PREINITSW flag to on. Following block 48, block 50 is a decision block that determines whether the pre-initialization function completed successfully. If so, control transfers to block 52 to set the error code to 0; otherwise, control transfers to block 54 to set the error code to 1. After either block 52 or block 54, control is transferred to block 56, which returns to the program or procedure that invoked the function.

Figure 4:
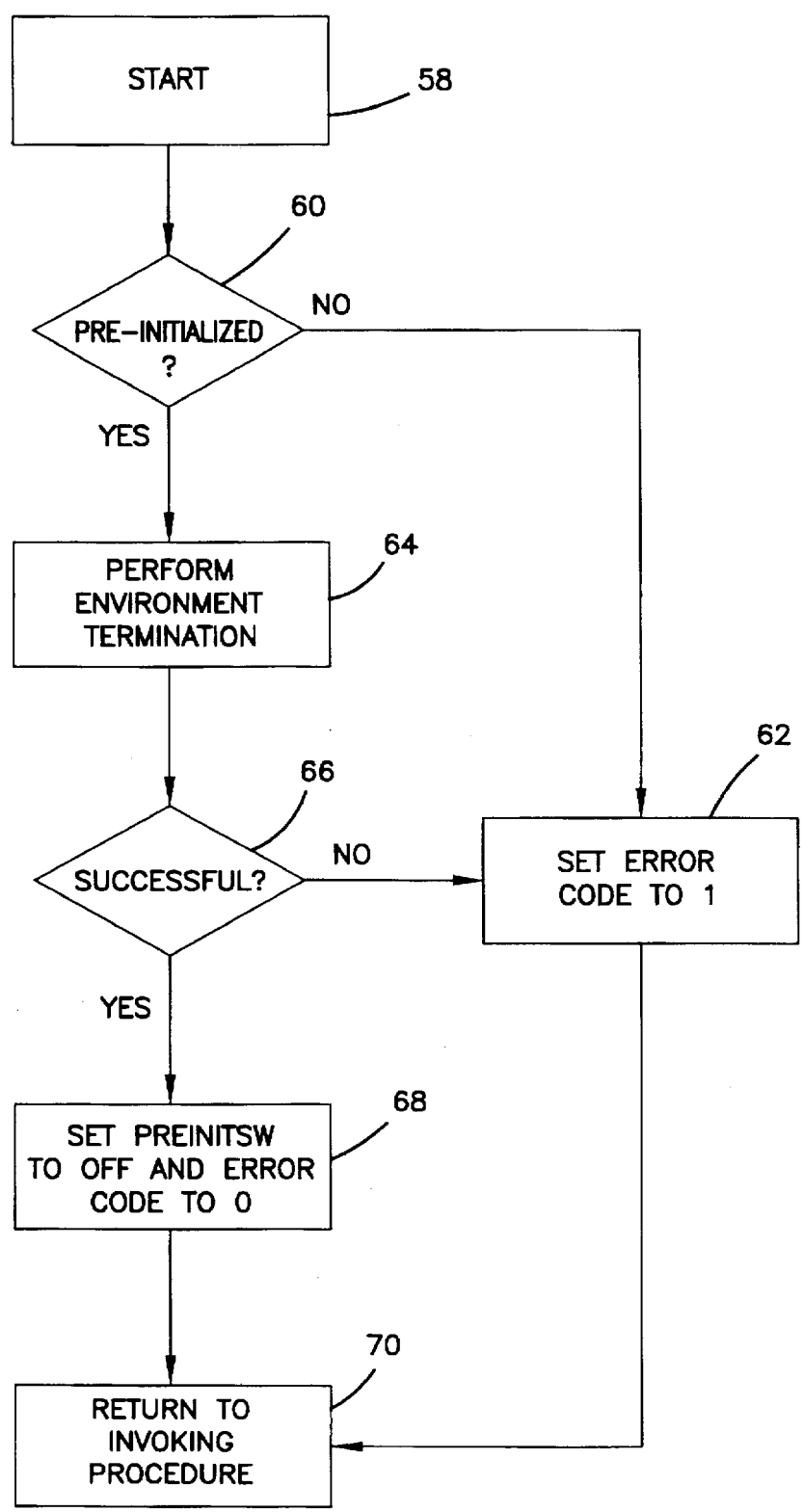
FIG. 4 is a flow chart illustrating the steps performed by the termination function according to the present invention.

FIG. 4 is a flow chart illustrating the steps performed by the termination function in the run-time library 28 according to the present invention. Block 58 represents the start of the function. Following block 58, block 60 is a decision block that determines whether the language execution environment was pre-initialized. If not, control transfers to block 62; otherwise, control transfers to block 64. Block 62 sets the error code to 1. Following block 62, control is transferred to block 70, which returns to the invoking procedure.

Block 64 performs the environment termination function. Following block 64, block 66 is a decision block that determines whether the environment termination was successful. If not, control transfers to block 62; otherwise, control transfers to block 68. Block 68 sets the PREINITSW flag to off and sets the error code to 0. Following block 68, control is transferred to block 70, which returns to the invoking procedure.

Figure 5A:
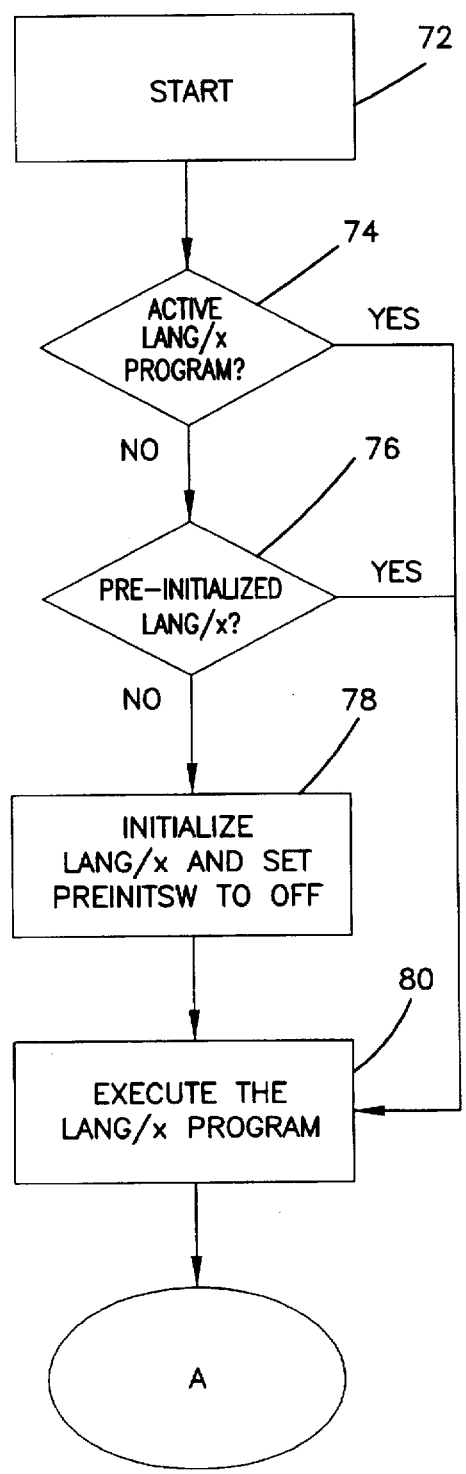
FIGS. 5A and 5B together are a flow chart illustrating the steps performed during execution of an object program in a language execution environment according to the present invention.
Figure 5B:
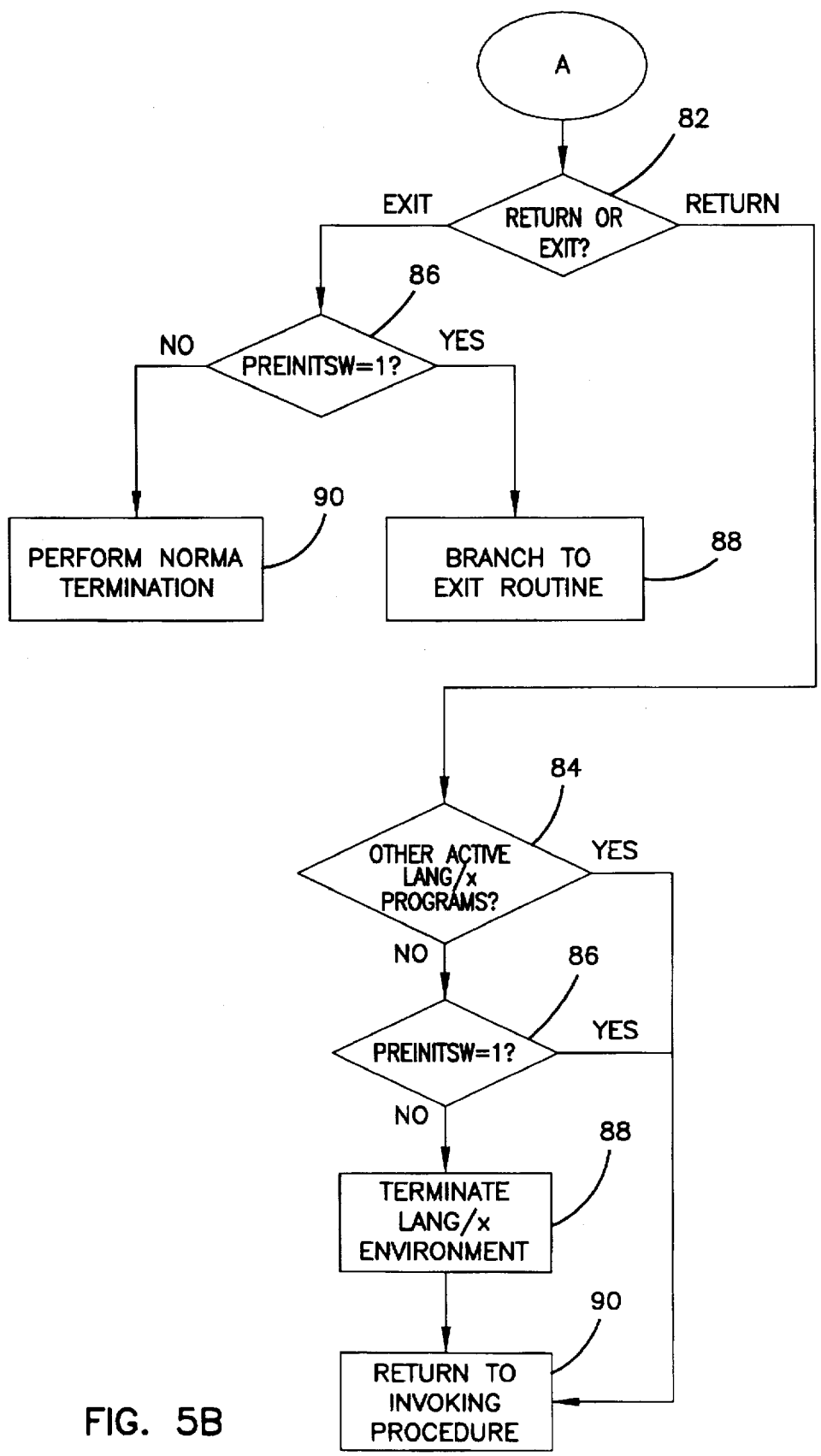

FIGS. 5A and 5B together are a flow chart illustrating the steps performed by the run-time library 28 during the execution of the second object program 26 according to the present invention. Block 72 represents the start of the function. Following block 72, block 74 is a decision block that determines whether another object program for the language execution environment, i.e., LANG/x, has been previously invoked and is still active in the stack. If so, control transfers to block 80 to execute the desired LANG/x object program; otherwise, control transfers to block 76. Block 76 is a decision block that determines whether the LANG/x language execution environment has been pre-initialized. If so, the control transfers to block 80; otherwise, control transfers to block 78. Block 78 initializes the LANG/x language execution environment and sets the PREINITSW flag to off. Following block 78, block 80 executes the object program. Following block 80, control transfers to block 82 in FIG. 5B. Block 82 is performed after the object program has completed its execution and has attempted termination via a return or exit instruction. Block 82 is a decision block that determines whether the attempted termination by the object program involved a return instruction (i.e., GOBACK in COBOL) or an exit instruction (i.e., STOP RUN in COBOL). If the attempted termination involved a return instruction, then control transfers to block 84; if the attempted termination involved an exit instruction, then control transfers to block 86.

Block 86 is a decision block that determines whether the PREINITSW flag is set to 1. If so, control transfers to block 88; otherwise, control transfers to block 90. Block 88 branches to the termination exit routine specified in the pre-initialization function and passes the token specified in the pre-initialization function to the termination exit routine. Block 90 performs a normal application termination.

Returning now to block 82, control is transferred to block 84 when the attempted termination of the object program involved a return instruction. Block 84 is a decision block that determines whether there are any other LANG/x object programs currently executing and active in the language execution environment. If so, the control transfers to block 90 to return to the invoking procedure; otherwise, control transfers to block 86. Block 86 is a decision block that determines whether the PREINITSW flag is 1. If so, control transfers to block 90; otherwise, control transfers to block 88. Block 88 performs a termination of the LANG/x language execution environment. Following block 88, block 90 returns to the invoking procedure.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention.

In addition, any program which calls and/or is called by other programs, if these other programs use different language execution environments, could benefit from the present invention.

In summary, the present invention discloses a method, apparatus, and article of manufacture for pre-initializing, maintaining, and terminating a persistent language execution environment.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a program in a computer, comprising the steps of:
   (a) executing a first computer program in a first language execution environment in the computer;
   (b) pre-initializing a second language execution environment for a second computer program from the first computer program executing in the computer, wherein the first language execution environment is different from the second language execution environment;
   (c) executing the second computer program in the second language execution environment in the computer;
   (d) intercepting an attempted termination of the second computer program in the computer; and
   (e) transferring control to an exit termination routine in the first computer program after the attempted termination is intercepted.

2. The method of claim 1, wherein the pre-initializing step comprises the step of indicating that the second language execution environment is persistent.

3. The method of claim 1, wherein the pre-initializing step comprises the step of storing an address for the exit termination routine.

4. The method of claim 1, wherein the pre-initializing step comprises the step of storing an address of a token to pass to the exit termination routine.

5. The method of claim 1, wherein the intercepting step further comprises the step of preventing the attempted termination of the second computer program.

6. The method of claim 1, wherein the transferring step further comprises the step of passing a token to the termination exit routine.

7. The method of claim 6, wherein the token is an address of an instruction in the computer.

8. The method of claim 7, wherein the address resides in the first computer program.

9. The method of claim 1, further comprising the step of terminating the second computer program after control has been transferred to the termination exit routine.

10. An apparatus for executing a program, comprising:
    (a) a computer;
    (b) means, performed by the computer, for executing a first computer program in a first language execution environment in the computer;
    (c) means, performed by the computer, for pre-initializing a second language execution environment for a second computer program from the first computer program in the computer, wherein the first language execution environment is different from the second language execution environment;
    (d) means, performed by the computer, for executing the second computer program in the second language execution environment in the computer;
    (e) means, performed by the computer, for intercepting an attempted termination of the second computer program in the; and
    (f) means, performed by the computer, for transferring control to an exit termination routine in the first computer program after the attempted termination is intercepted.

11. An article of manufacture for use in executing a computer program in a computer, the article of manufacture comprising a computer-readable storage medium having one or more computer programs embodied therein that causes the computer to perform the steps of:
    (a) executing a first computer program in a first language execution environment in the computer;
    (b) pre-initializing a second language execution environment for a second computer program from the first computer program executing in the computer, wherein the first language execution environment is different from the second language execution environment;
    (c) executing the second computer program in the second language execution environment in the computer;
    (d) intercepting an attempted termination of the second computer program in the computer; and
    (e) transferring control to an exit termination routine in the first computer program after the attempted termination is intercepted.

12. The method of claim 1, wherein the second language execution environment is persistent.

13. The method of claim 1, further comprising the step of maintaining the second language execution environment in a persistent state regardless of the second computer program's status.

14. The method of claim 1, further comprising the step of terminating the second language execution environment from the first computer program.

15. The apparatus of claim 10, wherein the pre-initializing step comprises the step of indicating that the second language execution environment is persistent.

16. The apparatus of claim 10, wherein the pre-initializing step comprises the step of storing an address for the exit termination routine.

17. The apparatus of claim 10, wherein the pre-initializing step comprises the step of storing an address of a token to pass to the exit termination routine.

18. The apparatus of claim 10, wherein the intercepting step further comprises the step of preventing the attempted termination of the second computer program.

19. The apparatus of claim 10, wherein the transferring step further comprises the step of passing a token to the termination exit routine.

20. The apparatus of claim 19, wherein the token is an address of an instruction in the computer.

21. The apparatus of claim 20, wherein the address resides in the first computer program.

22. The apparatus of claim 10, further comprising means for terminating the second computer program after control has been transferred to the termination exit routine.

23. The apparatus of claim 10, wherein the second language execution environment is persistent.

24. The apparatus of claim 10, further comprising means for maintaining the second language execution environment in a persistent state regardless of the second computer program's status.

25. The apparatus of claim 10, further comprising means for terminating the second language execution environment from the first computer program.

26. The article of manufacture of claim 11, wherein the pre-initializing step comprises the step of indicating that the second language execution environment is persistent.

27. The article of manufacture of claim 11, wherein the pre-initializing step comprises the step of storing an address for the exit termination routine.

28. The article of manufacture of claim 11, wherein the pre-initializing step comprises the step of storing an address of a token to pass to the exit termination routine.

29. The article of manufacture of claim 11, wherein the intercepting step further comprises the step of preventing the attempted termination of the second computer program.

30. The article of manufacture of claim 11, wherein the transferring step further comprises the step of passing a token to the termination exit routine.

31. The article of manufacture of claim 30, wherein the token is an address of an instruction in the computer.

32. The article of manufacture of claim 31, wherein the address resides in the first computer program.

33. The article of manufacture of claim 11, further comprising the step of terminating the second computer program after control has been transferred to the termination exit routine.

34. The article of manufacture of claim 11, wherein the second language execution environment is persistent.

35. The article of manufacture of claim 11, further comprising the step of maintaining the second language execution environment in a persistent state regardless of the second computer program's status.

36. The article of manufacture of claim 11, further comprising the step of terminating the second language execution environment from the first computer program.

* * * * *